May 6, 1924.

C. C. KOELN

METHOD OF EXPANDING THE EDGES OF CUTTERS

Filed Sept. 16, 1922

1,492,803

Inventor:
CHRISTIAN C. KOELN,
By John H. Bruninga,
His Attorney.

Patented May 6, 1924.

UNITED STATES PATENT OFFICE.

CHRISTIAN C. KOELN, OF ST. LOUIS, MISSOURI.

METHOD OF EXPANDING THE EDGES OF CUTTERS.

Application filed September 16, 1922. Serial No. 588,605.

*To all whom it may concern:*

Be it known that I, CHRISTIAN C. KOELN, a citizen of the United States, and residing at St. Louis, Missouri, have invented the new and useful Improvement in Methods of Expanding the Edges of Cutters, of which the following is a specification.

This invention relates to tools and more particularly to boring tools. This application is a continuation of application Serial Number 437,813, filed January 17, 1921, (now Patent No. 1,438,653, patented December 12, 1922) as to subject matter which is common between the two applications.

In some classes of tools, such as boring tools, a cutter is used which has cutting edges at its ends adapted for cooperation with the work to form therein a hole of a given diameter as determined by the distance between the cutting edges. Accordingly the cutting edges are accurately ground in order to form the hole with the required accuracy, and in most classes of work, even slight variations cannot be tolerated. Of course, the cutting edges of even high speed steel will become dull, but where sharpening is attempted, in such cases the grinding operation will reduce the distance between the cutting edges so that a hole of the desired diameter cannot be bored.

In order to permit grinding of the cutting edges while still maintaining the proper distance therebetween, mechanical adjustment is resorted to; this, however, presents mechanical difficulties and requires a divided cutter subject to errors and not as satisfactory as a one-piece cutter in which the cutting edges are connected by a body of metal.

It is objectionable to provide for the expansion of the cutting edges of a cutter by the formation of a single depression or opposite depressions in the body joining the edges, for this not only weakens the cutter considerably but limits the expansion which can be obtained; keeping in mind that the purpose of expansible cutters is to permit successive expansions as the cutting edges wear down or to provide for adjustments for varying diameters within limits.

One of the objects of this invention, therefore, is to provide a method of expanding the cutting edges of a cutter having a malleable body joining those edges, whereby a series of expansions may be readily obtained and whereby the cutter itself will not be weakened appreciably.

Further objects will appear from the detail description taken in connection with the accompanying drawing, in which.

Referring to the accompanying drawing, 1 designates a boring bar which is provided, as usual, with a slot adapted to receive the body 2 of the cutter which is secured in place by a gib 3 and an ordinary taper pin 4. The general construction of such a cutter is well known in the art and further detail description thereof is, therefore, unnecessary.

The cutter comprises a body 2 of a malleable material, that is, one capable of being extended or shaped by beating with a hammer or by transverse pressure. A good material for such a purpose is ordinary cold rolled steel. This body joins a pair of cutting edges 6 which may be formed of high speed steel and set into the body and secured, as by welding.

Figure 1:
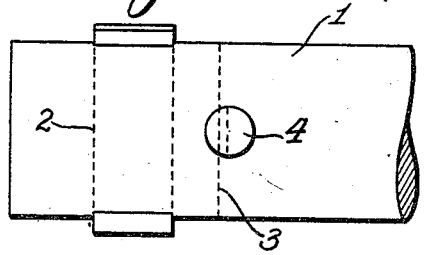
Figure 1 is an elevation of a boring bar showing a cutter embodying this invention.
Figure 2:
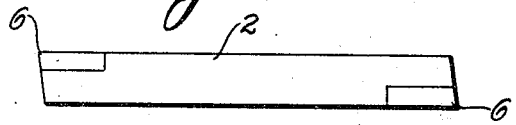
Figure 2 is a side elevation of a cutter before expansion.
Figure 3:
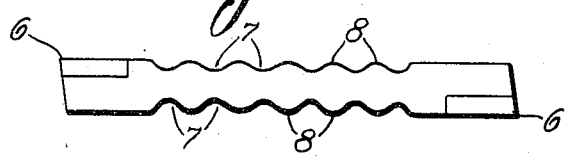
Figure 3 is a similar view showing the cutter partially expanded.

Assuming now that the cutter is to be extended so as to expand the cutting edges, in order to compensate for wear or to readjust the cutter to a larger diameter, the procedure is as follows: The cutter being removed from the boring bar, is subjected to transverse pressure applied at a series of points therealong in order to provide a series of transverse depressions 7 as shown in Figure 3 and transverse ridges 8 spaced along the body. This may be accomplished with any suitable forming tool. The action is to cause pressure flow of the body metal longitudinally of the body and in this way the cutting edges are expanded. Ordinarily this expansion need only be a few thousandths of an inch and even a small amount of pressure will cause the desired extension. After the desired extension has been obtained so that the edges will be expanded beyond their normal spacing, these edges can be reground so as to sharpen the cutter and this grinding can be continued until the cutter is ground down to the proper spacing of the cutting edges.

Figure 4:
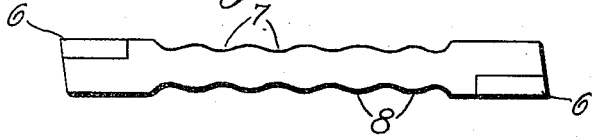
Figure 4 is a similar view showing the cutter still further expanded.

It will be seen that the cutter body in the form shown in Figure 3 is undulated so as to present alternate hills and valleys along the body. If it is now desired to extend the cutting edges still more, this can be accomplished by transverse pressure applied to the body part and on the undulations, so as to cause pressure flow of the material of the body and rectification of or straightening of the undulations, to cause expansion of the edges so as to space these edges still further apart. This may be accomplished by placing the cutter on an anvil and hammering down on the hills 8 so as to flatten them or by hammering in the valleys so as to spread them still further; either of these operations will cause a pressure flow of the body metal and extension of the body lengthwise so as to cause the desired expansion of the cutting edges as shown in Figure 4. These cutting edges may be then reground as previously described.

It will, therefore, be seen that in accordance with this invention a simple method is provided for expanding the cutting edges of a cutter. By applying transverse pressure to the malleable body at a series of points therealong, the desired extension cannot only be readily obtained with comparatively light pressures and indentations, but the body itself is maintained of substantial proportions so as to properly function as a cutter especially when under heavy duty. Furthermore by alternately undulating the malleable body and rectifying these undulations, adjustment of the cutting edges can not only be more readily obtained, but the limits of those adjustments can also be extended.

It is obvious that various changes may be made in details, within the scope of the appended claims, without departing from the spirit of this invention; it is, therefore, to be understood that this invention is not to be limited to the specific details shown and described.

Having thus described the invention, what is claimed is:

1. The method of expanding the cutting edges of a cutter having a malleable body joining those edges, comprising, applying transverse pressure to the malleable body at a series of points therealong, in order to cause pressure flow of the body metal longitudinally of the body.

2. The method of expanding the cutting edges of a cutter having a malleable body joining those edges, comprising, undulating the malleable body at a series of points therealong, in order to cause pressure flow of the body metal longitudinally of the body.

3. The method of expanding the cutting edges of a cutter having a malleable body joining those edges, comprising, applying transverse pressure to the malleable body at a series of points therealong, and applying transverse pressure to the malleable body intermediate those points, in order to cause pressure flow of the body metal longitudinally of the body.

4. The method of expanding the cutting edges of a cutter having a malleable body joining those edges, comprising, undulating the malleable body at a series of points therealong, and rectifying the undulations, in order to cause pressure flow of the body metal longitudinally of the body.

5. The method of expanding the cutting edges of a cutter having a malleable body joining those edges, comprising, forming transverse depressions in the malleable body at a series of points therealong, in order to cause pressure flow of the body metal longitudinally of the body.

6. The method of expanding the cutting edges of a cutter having a malleable body joining those edges, comprising, forming transverse depressions in the malleable body at a series of points therealong, and applying transverse pressure to the body intermediate those depressions, in order to cause pressure flow of the body metal longitudinally of the body.

7. The method of expanding the cutting edges of a cutter having an undulatory malleable body joining those cutting edges, comprising, applying pressure to the undulated body so as to rectify the undulations in order to cause extension of the body.

In testimony whereof I affix my signature this 9th day of August, 1922.

CHRISTIAN C. KOELN.